Figure 1:
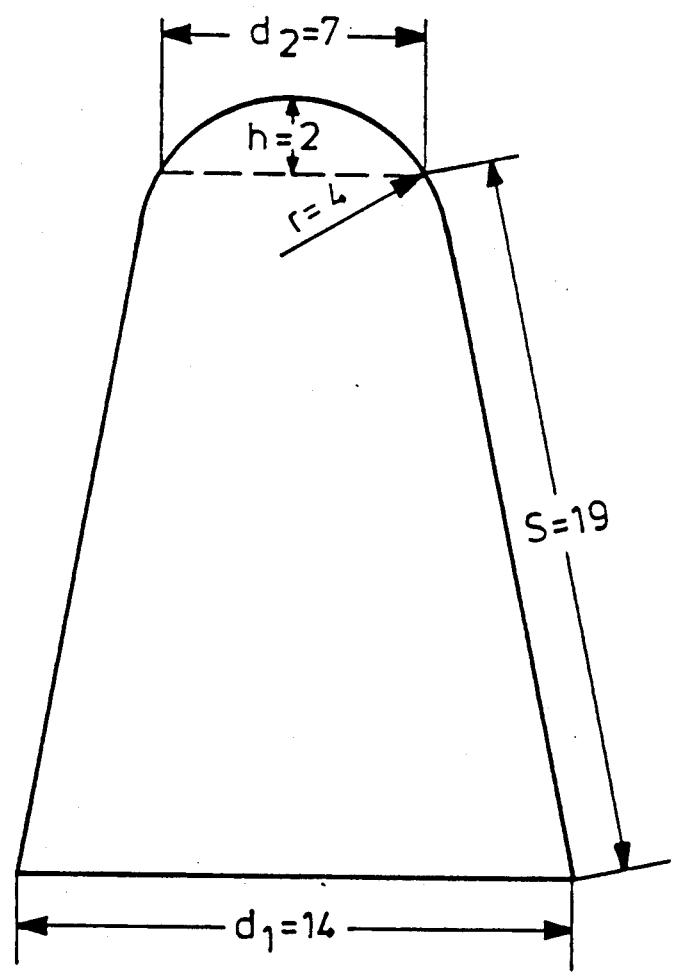

United States Patent [19]

Piejko et al.

[11] Patent Number: 5,047,473

[45] Date of Patent: Sep. 10, 1991

[54] FLEXIBLE POLYMER MIXTURES

[75] Inventors: Karl-Erwin Piejko, Gladbach; Christian Lindner; Hans-Eberhard Braese, both of Koeln; Rolf Kubens, Odenthal; Karl-Heinz Ott, Leverkusen, all of Fed. Rep. of Germany

[73] Assignee: Bayer Aktiengesellschaft, Leverkusen-Bayerwerk, Fed. Rep. of Germany

[21] Appl. No.: 283,537

[22] Filed: Dec. 12, 1988

[30] Foreign Application Priority Data

Dec. 22, 1987 [DE] Fed. Rep. of Germany ....... 3743489

[51] Int. Cl.$^5$ ..................... C08L 31/02; C08L 33/08; C08L 51/04

[52] U.S. Cl. ..................... 525/71; 524/501; 525/80; 525/85

[58] Field of Search ............. 525/71, 85, 80

[56] References Cited

U.S. PATENT DOCUMENTS 4,585,832 4/1986 Kobubo ................. 525/71

*Primary Examiner*—Jacob Ziegler
*Attorney, Agent, or Firm*—Connolly and Hutz

[57] ABSTRACT

This invention relates to flexible, soft polymer mixtures which are suitable for the production of sheets with a leather-like appearance and can be worked up by calendering and deep drawing and to a process for their preparation.

4 Claims, 1 Drawing Sheet

FLEXIBLE POLYMER MIXTURES

This invention relates to flexible, soft polymer mixtures which are suitable for the production of sheets with a leather-like appearance and can be processed by calendering and deep drawing.

Sheets with a leather-like appearance are at present very important, for example for the interior trim of motor vehicles. They are generally produced by calendering an unfinished sheet, followed by deep drawing. The polymer material used is in most cases polyvinyl chloride mixed with various vinyl polymers and plasticizers. These sheets have only limited resistance to ageing at high temperatures and contain volatile components which tend to migrate, as well as halogen. These disadvantages may be attributed mainly to the polyvinyl chloride. There is therefore a demand for a plastics materials which contains no polyvinyl chloride and is suitable for the production of leather-like sheets.

It has been found that a polymer mixture of a special graft polymer of acrylonitrile on acrylate rubber, a special graft polymer of methyl methacrylate on acrylate rubber, a special alkyl acrylate rubber and optionally certain resin-like copolymers are eminently suitable for the production of sheets which may, if desired, be embossed to give them a leather-like appearance and deep drawn. The sheets obtained are resistant to ageing (temperature ageing) and superior to polyvinyl chloride systems. For processing on an industrial scale, only very small quantities of auxiliary substances are required (stabilizers, lubricants, mould release agents, etc.), compared with those required for known materials based on polyvinyl chloride.

This invention therefore relates to soft, flexible polymer mixtures of a) 30-70 parts by weight of a graft polymer of a mixture of 25-40 parts by weight, in particular 30-40 parts by weight of acrylonitrile and 75-60 parts by weight, in particular 70 to 60 parts by weight of styrene, α-methylstyrene, alkyl methacrylate or mixtures thereof on particulate, highly cross-linked alkyl acrylate rubbers having an average particle diameter ($d_{50}$) of from 0.1 to 0.8 μm, with a total rubber content of 20-55% by weight, prepared with a graft yield greater than 25% by weight, preferably greater than 40% by weight, b) 60-5 parts by weight of a graft polymer of
  (b1) methyl methacrylate, optionally in combination with up to 30% by weight of styrene, acrylonitrile and/or alkyl acrylate or
  (b2) a mixture of 20-40% by weight of acrylonitrile and 80-60% by weight of styrene, α-methylstyrene, alkyl methacrylate or mixtures thereof
on a particulate, highly cross-linked alkyl acrylate rubber having an average particle diameter ($d_{50}$) of from 0.1 to 0.8 μm, with a total rubber content of 65-90% by weight, and c) 10-40 parts by weight of a partially cross-linked rubber-like copolymer of 5-40% by weight of acrylonitrile, styrene, alkyl methacrylate or mixtures thereof and 95-60% by weight of alkyl acrylate with a gel content of from 20 to 99% by weight and a swelling index greater than 10, determined in dimethylformamide at 23° C., and d) optionally up to 6% by weight, in particular from 1-5% by weight, based on the total quantity of a+b+c, of a resinous polymer of at least 60% by weight of styrene, o-methylstyrene or alkyl methacrylate and up to 40% by weight of acrylonitrile or methacrylonitrile with a Staudinger index [η] (in dimethylformamide at 25° C.) of from 2-10 dl/g. in particular from 2.5-6 dl/g.

Graft polymers a) in the context of this invention are products of grafting vinyl monomers on particulate, at least partially cross-linked alkyl acrylate rubbers (graft bases), in particular those based on $C_2$-$C_8$-alkyl acrylate. Preferred acrylate rubbers have been obtained by cross-linking copolymerisation of alkyl acrylates with up to 2% by weight of polyfunctional vinyl and/or allyl monomers such as divinylbenzene, glycol-bis-acrylate, bisacrylamide, phosphoric acid triallylester, citric acid triallylester, triallylcyanurate, triallylisocyanurate, allyl esters of acrylic acid or methacrylic acid or maleic acid allyl ester, especially triallylcyanurate and triallylisocyanurate. The acrylate rubbers used as graft bases are preferably in the form of small particles and preferably have a bimodal distribution of the average particle diameter. These are strictly speaking mixtures of two particulate rubbers, one having an average particle diameter ($d_{50}$) of from 0.15 to 0.25 μm and the other an average particle diameter ($d_{50}$) of from 0.4 to 0.6 μm. The ratio by weight of the finely divided rubber to the coarse rubber is from 1:2 to 2:1. The mixture of the two rubbers which may be identical or different in their chemical structure then has a distribution curve of average particle diameters which shows two maxima.

Particularly suitable coarse particled rubbers are those which have a so-called core/shell structure (see DE-OS 3 006 804).

Particularly preferred graft bases for the preparation of component a) according to this invention are therefore mixtures of (larger) rubber particles which have a core/shell structure and (smaller) rubber particles without a core/shell structure. The rubber particles used for graft polymerisation are preferably partially cross-linked and have gel contents of from 50-98% by weight.

For the preparation of a), the vinyl monomers are graft polymerised in emulsion on emulsions of the above-described acrylate rubbers. The rubbers and vinyl monomers may be used inter alia in proportions of 20-55% by weight of rubber and 80-45% by weight of vinyl monomers. The vinyl monomers may be inter alia mixtures of from 25 to 40 parts by weight, in particular from 30 to 35 parts by weight of acrylonitrile and from 75 to 60 parts by weight, in particular from 70-65 parts by weight of styrene, α-methylstyrene or $C_1$-$C_6$-alkylmethacrylate, in particular mixtures of styrene and acrylonitrile. The vinyl monomers are preferably polymerised on the acrylate rubbers under conditions which result in a graft yield above 40% by weight, in particular above 50% by weight, i.e. a high proportion of the vinyl monomer should be chemically bound to the rubber (by covalent bonds). Acrylate rubbers normally only have a moderate graft yield since they contain very few reactive double bonds (compared with other diene rubbers). Higher graft yields are obtained by using redox initiators in known manner, preferably combinations of hydroperoxide and ascorbic acid, optionally with the addition of heavy metal cations.

Graft polymers b) in the conext of this invention are graft products having a graft shell of a polymer of 35-10 parts by weight of methyl methacrylate, optionally in combination with up to 30% by weight of styrene, acrylonitrile and/or alkyl acrylate, in particular $C_3$-$C_8$- alkylacrylate, preferably butyl acrylate, or a graft polymer of 35-10 parts by weight of a mixture of 20-35 parts by weight of acrylonitrile with 65-80 parts by weight of styrene, a-methylstyrene or $C_1$-$C_6$-alkyl methacrylate, especially styrene or acrylonitrile. The graft basis consists of 65-90 parts by weight of a particulate, partially cross-linked alkyl acrylate rubber having average particle diameters ($d_{50}$) of from 0.1-0.8 μm, preferably from 0.35-0.5 μm. Both in this case and in component a), the copolymers are preferably composed of $C_3$-$C_8$-alkyl acrylate with up to 3% by weight, preferably up to 2% by weight of polyfunctional monomers such as polyallyl compounds, preferably triallylcyanurate. The graft bases may have a bimodal particle size distribution exactly as in component a). The graft polymers b) may be prepared by conventional processes of radical emulsion graft polymerisation of vinyl monomers in the presence of the rubber latices at temperatures from 60° to 90° C., using water-soluble initiators such as peroxydisulphate or they may be prepared (like component a)) with the aid of special redox initiators, preferably combinations of hydroperoxide and ascorbic acid.

Polymers c) in the context of this invention are partially cross-linked, rubber-like terpolymers of ($C_1$) from 5-40 parts by weight of acrylonitrile, styrene, $C_1$-$C_6$-alkylmethacrylate in particular $C_1$-$C_3$-alkylmethacrylate) or mixtures thereof, especially acrylonitrile and/or methylmethacrylate, and ($C_2$) from 95-60 parts by weight of alkylacrylate, in particular $C_3$-$C_8$-alkylacrylate, and from 0.05 to 5% by weight, based on the sum of $C_1+C_2$, of a polyfunctional, copolymerisable polyvinyl or allyl compound, preferably triallylcyanurate, triallylisocyanurate, vinyl ethers of polyols, vinyl or allyl esters of polyfunctional carboxylic acids and bisacrylamides of diamines. The polymers c) have gel contents of from 20 to 99% by weight, preferably more than 40% by weight, and average particle diameters ($d_{50}$) of from 0.15 to 0.4 μm.

Polymers c) may be prepared in known manner by radical, aqueous emulsion polymerisation in the presence of anionic, surface-active substances.

Resinous polymers d) for the purpose of this invention are copolymers of from 100-60% by weight of styrene, α-methylstyrene or alkylmethacrylate (in particular $C_1$-$C_3$-alkylmethacrylate) and from 0-40% by weight of acrylonitrile or methacrylonitrile. The polymers are of high molecular weight but soluble in organic solvents, which means that they are not cross-linked. Preferred polymers d) are polyalkylmethacrylates and their copolymers with acrylonitrile. The polymers d) have Staudinger indices [η] (as a measure of their molecular weight) of from 2-10 dl/g, in particular from 2.5-6 dl/g (determined in dimethylformamide at 25° C.). They are preferably prepared by radical emulsion polymerisation in water.

The polymer mixture according to the invention may, for example, be prepared as follows: If the polymers are obtained as aqueous dispersions, these dispersions may be mixed in the required proportions of the solids contents and then worked up together, e.g. to a powder which may subsequently be compressed to a granulate with the addition of conventional auxiliary substances. Alternatively, the individual polymers may be worked up separately and then combined to form the mixture according to the invention, e.g. in screws, kneaders or powder mixers. The first method of working up is preferred. If desired, two or three of the polymers a) to d) may be worked up as a dispersion mixture and if necessary the missing component may subsequently be added to the composition according to the invention. It is particularly preferred to mix all the components of the dispersion and then work up the mixture, in particular by coagulation with electrolytes or by spray drying.

The gel contents and swelling indices were determined in dimethylformamide at 25° C. (see M. Hoffmann et al, Polymeranalytik II, Georg Thieme Verlag, Stuttgart, 1977). The particle diameters are average particle diameters $d_{50}$ (see "Ultrazentrifugenmessungen", W. Scholtan et al, Kolloidz. u.Z. Polymere 250 (1972) 783-796). The graft yield was determined by fractionating with liquids which have a demixing action (see R. Kuhn, Makromol. Chem. 177, 1525 (1976)). The graft yield is the ratio by weight of graft polymerised, resin forming monomers to the total quantity of resin forming monomers put into the process.

BRIEF DESCRIPTION OF THE INVENTION

FIG. 1 represents an illustration of a truncated cone used in the deep drawing test described in the following Examples.

EXAMPLES

1. Acrylate rubber as graft basis 1.1 The following is introduced into a reactor 10,300 Parts by weight of water and 5 parts by weight of $C_{14}$-$C_{18}$-alkylsulphonic acid sodium salt. The reactor is flushed with nitrogen for 30 minutes and heated to 70° C. under a light stream of nitrogen. The following solutions are added at a uniform rate over a period of 5 hours after the addition of a solution of 30 parts by weight of potassium peroxydisulphate in 100 parts by weight of water:

| Solution 1: | 9950 parts by weight of n-butylacrylate |
| | 50 parts by weight of tris-allylcyanurate |
| Solution 2: | 200 parts by weight of the sodium salt of $C_{14}$-$C_{18}$-alkyl sulphonic acid |
| | 7000 parts by weight of water. |

The reaction mixture is then polymerised for 4 hours at 70° C. An emulsion having a solids content of 35% is obtained. The average particle diameter of the latex $d_{50}$) is 160 nm, the gel content of the polymer is 91%.

1.2 The following are introduced into a reactor 17,232 Parts by weight of water and 588 parts by weight of a polybutadiene rubber latex having a polymer solids content of 42% by weight and an average particle diameter ($d_{50}$) of 140 nm. After the reaction mixture has been heated to 63° C., a solution of 49.2 parts by weight of potassium peroxydisulphate and 1152 parts by weight of water is added. The following mixtures are then introduced simultaneously into the reactor over a period of 5 hours at 63° C.:

| Solution 1: | 36,000 parts by weight of n-butylacrylate |
| | 81.6 parts by weight of triallylcyanurate |
| Solution 2: | 40,800 parts by weight of water |
| | 384 parts by weight of $C_{14}$-$C_{18}$-alkyl sulphonic acid sodium salt. |

The reaction mixture is then polymerised for 4 hours at 63° C. An emulsion having a polymer solids content of 37% by weight is obtained. The average latex particle diameter ($d_{50}$) is 480 mm. The polymer has a gel content of 93% by weight.

2. Components of the polymer mixtures

Component a 1

2000 Parts by weight of water, 833 parts by weight of latex 1.1 and 800 parts by weight of latex 1.2 are introduced into a reactor. The contents of the reactor are flushed with nitrogen for 30 minutes and heated to 61° C. The following two solutions are added with stirring:

| | |
|---|---|
| Solution 1: | 80 parts by weight of water |
| | 16 parts by weight of cumene hydroperoxide |
| | 1.3 parts by weight of $C_{14}$-$C_{18}$-alkyl sulphonic acid sodium salt |
| Solution 2: | 80 parts by weight of water |
| | 0.9 parts by weight of ascorbic acid. |
| Solutions 3-5 are then introduced simultaneously into the reactor at 61° C. within 7 hours. | |
| Solution 3: | 1160 parts by weight of styrene |
| | 600 parts by weight of acrylonitrile |
| Solution 4: | 800 parts by weight of water |
| | 18 parts by weight of $C_{14}$-$C_{18}$-alkyl sulphonic acid sodium salt |
| Solution 5: | 1100 parts by weight of water |
| | 5.6 parts by weight of ascorbic acid. |

The reaction mixture is left to polymerise for 4 hours at 61° C. An emulsion having a polymer solids cotent of 31.3% by weight is obtained. The rubber content of the polymer is 25% by weight and the graft yield is 60%.

Component a 2

1190 Parts by weight of water, 800 parts by weight of latex 1.1 and 760 parts by weight of latex 1.2 are introduced into a reactor. The reactor is flushed with nitrogen for 30 minutes and the contents are heated to 61° C. The following two solutions are added with stirring:

| | |
|---|---|
| Solution 1: | 48 parts by weight of water |
| | 8 parts by weight of cumene hydroperoxide |
| | 0.8 parts by weight of $C_{14}$-$C_{18}$-alkyl sulphonic acid sodium salt |
| Solution 2: | 48 parts by weight of water |
| | 0.5 parts by weight of ascorbic acid. |
| Solutions 3-5 are then introduced simultaneously into the reactor at 61° C. within 7 hours. | |
| Solution 3: | 554 parts by weight of styrene |
| | 286 parts by weight of acrylonitrile |
| Solution 4: | 260 parts by weight of water |
| | 10.8 parts by weight of $C_{14}$-$C_{18}$-alkyl sulphonic acid sodium salt |
| Solution 5: | 310 parts by weight of water |
| | 3.4 parts by weight of ascorbic acid. |

The reaction mixture is left to polymerise for 4 hours at 61° C. An emulsion having a polymer solids content of 32.7% by weight is obtained. The rubber content of the polymer is 40% by weight and the graft yield is 55%.

Component b 1

1080 Parts by weight of water, 2617 parts by weight of latex 1.1 and 2476 parts by weight of latex 1.2 are introduced into a reactor. The reactor is flushed with nitrogen for 30 minutes and the contents are heated to 61° C. The following two solutions are added with stirring:

| | |
|---|---|
| Solution 1: | 90 parts by weight of water |
| | 10 parts by weight of cumene hydroperoxide |
| | 1.5 parts by weight of $C_{14}$-$C_{18}$-alkyl-sulphonic acid sodium salt |
| Solution 2: | 90 parts by weight of water |
| | 0.6 parts by weight of ascorbic acid. |
| Solutions 3-5 are then introduced simultaneously into the reactor at 61° C. within 7 hours. | |
| Solution 3: | 518 parts by weight of styrene |
| | 267 parts by weight of acrylonitrile |
| Solution 4: | 400 parts by weight of water |
| | 10 parts by weight of $C_{14}$-$C_{18}$-alkyl sulphonic acid sodium salt |
| Solution 5: | 400 parts by weight of water |
| | 4 parts by weight of ascorbic acid. |

The reaction mixture is left to polymerise for 5 hours at 61° C. An emulsion having a polymer solids content of 33% by weight is obtained. The rubber content of the polymer is 70% by weight and the graft yield is 55%.

Component b 2

140 Parts by weight of water and 5765 parts by weight of latex 1.2 are introduced into the reactor. The reactor is flushed with nitrogen for 30 minutes and the contents are heated to 70° C. The following solution is added with stirring:

| | |
|---|---|
| Solution 1: | 131 parts by weight of water |
| | 3.3 parts by weight of potassium peroxydisulphate. |
| The following solutions 2 and 3 are then introduced simultaneously into the reactor at 70° C. within 4 hours: | |
| Solution 2: | 552 parts by weight of methyl methacrylate |
| Solution 3: | 722 parts by weight of water |
| | 8.2 parts by weight of $C_{14}$-$C_{18}$-alkyl sulphonic acid soldium salt. |

The reaction mixture is left to polymerise for 4 hours at 70° C. An emulsion having a polymer solids content of 37.3% by weight is obtained. The rubber content of the polymer is 80% by weight.

Component c

A solution of 2.5 parts by weight of the sodium salt of $C_{14}$-$C_{18}$-alkylsulphonic acids and 750 parts by weight of water is introduced into the reactor. After the reaction mixture has been heated to 70° C, 70 parts by weight of monomer solution A) are added and polymerisation is initiated by the addition of a solution of 3.5 parts by weight of potassium peroxydisulphate in 50 parts by weight of water. The remainder of solution A) and solution B) are then introduced at a uniform rate over a period of 6 hours at 70° C. and the mixture is polymerised within 4 hours. A latex having as polymer solids content of 38% by weight, an average particle diameter ($d_{50}$) of 180 nm and a gel content (in dimethylformamide at 25° C.) of 98% by weight is obtained.

| | |
|---|---|
| Solution A: | 1105 parts by weight of n-butylacrylate |
| | 7 parts by weight of triallylcyanurate |
| | 474 parts by weight of acrylonitrile |
| Solution B: | 30 parts by weight of the sodium salt of $C_{14}$-$C_{18}$-alkyl sulphonic acids |
| | 1790 parts by weight of water. |

Component d

Emulsion polymer of 66% by weight of methyl methacrylate and 34% by weight of acrylonitrile with a Staudinger index $[\eta]$ of 5.4 dl/g (in dimethylformamide at 25° C.).

3. Preparation and properties of the polymer mixtures

The polymer mixtures whose composition is described in Table 1 and properties in Table 2 were prepared by mixing emulsions of their components in the required quantities, adding 1% by weight (based on the solids content) of a phenolic stabilizer and coagulating with an aqueous magnesium sulphate solution. The powders initially obtained are filtered off, washed and dried at 60° C. The dried powders are homogenized on mixing rollers at 200° C. for 10 minutes after the addition of 0.5% by weight of ester wax and are then compression moulded to form test samples at 190° C. The properties of the test samples are shown in Table 2.

| Test methods: | |
| --- | --- |
| Tensile strength | DIN 53 455 |
| Elongation | DIN 53 455 |
| Tear propagation resistance | DIN 53 515 |
| Shore hardness | DIN 53 505/Type D |
| Vicat temperature | Method A |
| Cold strength | DIN 53 372 |

TABLE 1

Composition of the polymer mixtures (in parts by weight)

| Experiment No. | Components | | | | | |
| --- | --- | --- | --- | --- | --- | --- |
| | a (1) | a (2) | b (1) | b (2) | c | d |
| 3.1 | 45 | — | 35 | — | 20 | — |
| 3.2 | — | 55 | — | 25 | 20 | — |
| 3.3 | — | 50 | — | 35 | 15 | 5.5 |
| 3.4 | — | 50 | 20 | — | 30 | 5 |
| 3.5 | — | 35 | 45 | — | 20 | — |
| 3.6* | 40 | — | — | 60 | — | — |
| 3.7* | 60 | — | — | 40 | — | — |
| 3.8* | 60 | — | — | — | 40 | — |
| 3.9* | — | 50 | — | 50 | — | — |
| 3.10* | — | 60 | — | — | 40 | — |

*These mixtures are not according to the invention. They serve for comparison.

TABLE 2

Properties of the mixtures from Table 1 (* = Comparison mixture)

| Experiment No. | Tensile strength [MPa] | Elongation [%] | Tear propagation resistance [N/mm] | Shore hardness [15"] | Vicat A [°C.] | Cold strength [°C.] | Response to deep drawing |
| --- | --- | --- | --- | --- | --- | --- | --- |
| 3.1 | 19.3 | 177 | 66 | 46 | 104 | −30 | + |
| 3.2 | 17.0 | 196 | 58 | 42 | 97 | −32 | + |
| 3.3 | 13.8 | 154 | 49 | 41 | 95 | −35 | + |
| 3.4 | 19.1 | 205 | 67 | 47 | 97 | −34 | + |
| 3.5 | 14.5 | 173 | 44 | 36 | 92 | −45 | + |
| 3.6* | 11.8 | 97 | 57 | 45 | 64 | +3 | − |
| 3.7* | 15.4 | 154 | 82 | 53 | 76 | +15 | − |
| 3.8* | 24.4 | 196 | 75 | 56 | 103 | −6 | − |
| 3.9* | 8.2 | 125 | 32 | 26 | 61 | −32 | +[1] |
| 3.10* | 20.2 | 205 | 62 | 45 | 95 | −30 | − |

[1] deep drawn sheet has a waxy feel

Deep drawing test

A sheet produced on rollers (length 300 mm, width 300mm, thickness 1 mm) is clamped into a deep drawing mould and heated to a surface temperature of 160° C. and 175° C. (determination of the surface temperature by means of a fusible salt). A truncated cone as illustrated in FIG. 1 is pushed into the sheet to a depth of 21 cm under a vacuum.

In FIG. 1 the letter designations are merely arbitrary designations for the parts of the truncated cone illustrated and the related numerical values have centimeter units.

Assessment

+: A hollow body of uniform wall thickness having the form of the truncated cone is obtained at a surface temperature of 160° C. and of 175° C.

−: The sheet tears.

The test data of Table 2 show that polymer mixtures 3.1 to 3.5 according to the invention have a balanced combination of properties superior to that of conventional sheets containing PVC. Embossed sheets with a leather-like appearance and handle may be produced from these mixtures by deep drawing. The properties of the comparison mixtures 3.6* to 3.10* deteriorate sharply under these conditions and deep drawn sheets suitable for use cannot be produced from them.

4. Comparison of the age resistance of polymer mixtures 3.1–3.5 according to the invention with that of known deep drawing moulding compounds containing polyvinyl chloride Sheets of the materials are stored at 130° C. and 150° C. for 21 days. The sheets which contain polyvinyl chloride undergo discolouration ranging from dark brown to black whereas the colour the sheets according to the invention undergoes virtually no change.

We claim:

1. A soft, flexible polymer mixture comprising
   a) 30–70 parts by weight of a graft polymer of a mixture of 25–40 parts by weight of acrylonitrile and 75–60 parts by weight of styrene, α-methylstyrene, alkylmethacrylate or mixtures thereof on particulate, cross-linked alkylacrylate rubbers having an average particle diameter ($d_{50}$) of from 0.1 to 0.8 μm with a total rubber content of 20 to 55% by weight, prepared with a graft yield greater than 25% by weight,
   b) 60–5 parts by weight of a graft polymer of
      (b1) methyl methacrylate, in combination with up to 30% by weight of styrene, acrylonitrile, alkyl acrylate, or mixtures thereof
      b2) a mixture of 20 to 40% by weight of acrylonitrile and 80 to 60% by weight of styrene, α-methylstyrene, alkylmethacrylate or mixtures thereof
   on a particulate, cross-linked alkylacrylate rubber having an average particle diameter ($d_{50}$) of from 0.1 to 0.8 μm with a total rubber content of 65 to 90% by weight, and
   c) 10–40 parts by weight of a partially cross-linked, rubber-like copolymer of 5–40% by weight of acrylonitrile, styrene, alkyl methacrylate or mixtures thereof and 95-60% by weight of alkyl acrylate having a gel content of from 20 to 99% by weight and a swelling index greater than 10, determined in dimethylformamide at 23° C.

2. A polymer mixture as claimed in claim 1 wherein the graft polymer a) comprises 30-40 parts by weight of acrylonitrile and 70-60 parts by weight of styrene, α-methylstyrene, alkylmethacrylate or mixtures thereof.

3. A polymer mixture as claimed in claim 1 wherein the graft yield of the graft polymers a) is greater than 40 percent by weight.

4. A polymer mixture as claimed in claim 2 wherein the graft yield of the graft polymers a) is greater than 40% by weight.

* * * * *